March 25, 1969    G. H. JOSEPHSEN ET AL    3,435,339
BIMETALLIC THERMOSTATIC DEVICE HAVING AMBIENT
TEMPERATURE COMPENSATION BY MEANS OF A
U-SHAPED BIMETAL ELEMENT WITH A
PERMANENTLY SET LEG
Filed Feb. 23, 1966

INVENTORS
Gene H. Josephsen
Frank C. Weaver.

By William J. Newman
Attorney

United States Patent Office 3,435,339
Patented Mar. 25, 1969

3,435,339
BIMETALLIC THERMOSTATIC DEVICE HAVING AMBIENT TEMPERATURE COMPENSATION BY MEANS OF A U-SHAPED BIMETAL ELEMENT WITH A PERMANENTLY SET LEG
Gene H. Josephsen and Frank C. Weaver, Chicago, Ill., assignors to Stewart-Warner Corporation, Chicago, Ill., a corporation of Virginia
Filed Feb. 23, 1966, Ser. No. 529,575
Int. Cl. G01r 5/22
U.S. Cl. 324—105                                4 Claims

ABSTRACT OF THE DISCLOSURE

A bimetallic thermostatic device having a U-shaped bimetallic element with its actuating leg permanently deflected towards the cold side so as to reduce scale errors due to extreme changes in ambient temperature conditions.

---

This invention relates to bimetallic thermostatic devices and more particularly to improvements in arrangements for compensating for ambient temperature changes in bimetallic gauges and regulators.

Gauges of the type to which this invention is applicable generally comprise a bimetal actuator having a heater winding for controlling or actuating an indicator or pointer and are commonly called thermal gauges. The position of the free end of the bimetal is made to vary in accordance with a condition of the unit or object to be measured such as automobile engine temperature or automobile fuel supply. The measured condition is caused to vary the electrical energy passing through the heater winding on the bimetal actuator which produces heat as a function thereof and controls the movement of the bimetal actuator. The bimetal in reacting to the electrical energy in the heater winding is adapted to move, pivot or rotate the pointer in accordance with the electrical energy which passes through the winding. The pointer thereby indicates or registers the value of the condition which the gauge represents.

Voltage regulators of the type to which this invention is applicable generally comprise the same type of bimetal and heater winding, the difference being the use of a set of contacts at the free end of the bimetal in place of the indicator or pointer. The purpose of a voltage regulator is to provide a constant time average voltage to the bimetal gauge regardless of changes in voltage of the primary power source. This is accomplished in a well known manner by causing the contacts to open and close at a rate dependent on the voltage level of the primary source. A representative gauge and voltage regulator of the type described is illustrated in Patent No. 2,991,418 issued to Edmund William Kraft on July 4, 1961.

Bimetal devices, being heat responsive devices are necessarily effected by ambient temperature conditions. It is well known that provisions are usually made to compensate for ambient temperature conditions by the utilization of U-shaped bimetal elements. This serves to eliminate error of the devices at the low or unenergized portion of their path of travel, but errors at the high end or maximum energized portions of their movement are still present as will be seen in the detailed explanation of this invention.

The present invention is designed to reduce the error at the high energy end of the bimetal device movement by a very simple mechanical expedient. Briefly, this is accomplished by providing a permanent deflection in the actuating free end of the bimetal in the direction of cold movement of a substantial amount and preferably about ½ the total deflection the actuating free end assumes over the total range of the device.

Accordingly, it is an object of this invention to provide improved temperature compensation means for bimetal thermostatic devices.

It is also an object of this invention to provide improved temperature compensation of bimetal devices without materially increasing their cost.

Another object of this invention is to provide ambient temperature compensation for bimetal gauges and voltage regulators by arrangements which add no additional components to the devices.

Other objects and advantages of this invention will become apparent on a reading of the following specification, especially in conjunction with the accompanying drawings in which FIG. 1 is an isometric view, partially in schematic, of a bimetal thermostatic gauge indicator mechanism showing partially schematically the important components thereof for purposes of this invention;

Figure 1:
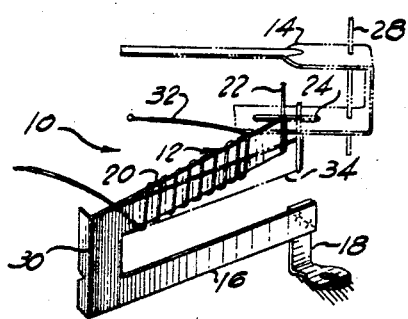

A bimetal thermostatic gauge indicator 10 is a simple device, the essential components of which are a U-shaped bimetal element 12 and a pointer 14. One leg 16 of the bimetal element 12 has its end 18 fixed to supporting means such as the gauge housing, or the like, and may be termed the compensating portion of the bimetal element. The other leg 20 carries a pin 22 at its free end which cooperates with a slot 24 in the pointer 14 to rotate the pointer 14 about its axis 28. Thus, the leg 20 may be termed the actuating portion of the bimetal element. The two legs 16 and 20 are joined at their other ends by a bridge portion 30 which is preferably integral with each of the legs.

The U-shaped element 12 is formed of at least two layers of different metals having substantially different thermal coefficients of expansion so that the element will assume a curved configuration or straight configuration in accordance with its temperature.

An electric heater winding 32 surrounds the actuating leg 20 of the bimetal element to which electrical energy is applied in accordance with the parameter being measured. For example, if the gauge 10 is to be used as an automobile fuel supply meter, winding 32 might be series connected with the automobile battery and a rheostat actuated by the float riding on the surface of the fuel in the gas tank. The level of the fuel determines the current through the winding 32 which determines the amount of deflection of the arm 20 with respect to the fixed arm 16 and hence the position of the indicating pointer 14. In prior art devices the bimetal element 12 for a gauge indicator is fabricated so that the two legs 16 and 20 generally lie in the same plane when the winding 32 is unenergized as indicated by the dotted lines 34. In the device of the present invention the arm 20 is fabricated with a permanent deflection in a manner and for the purposes to be hereinafter discussed.

Figure 2:
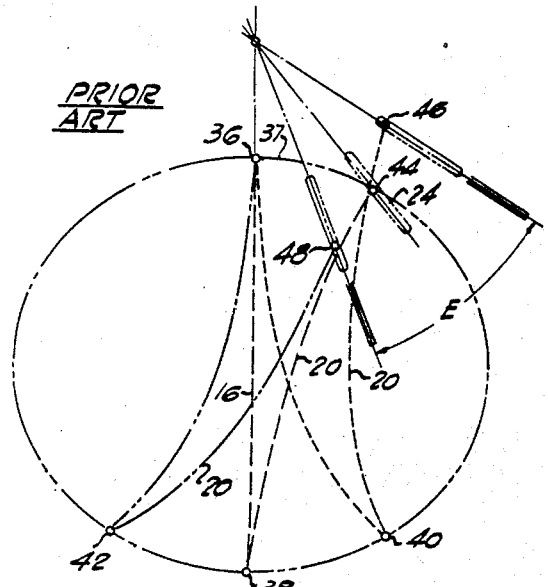
FIG. 2 is a diagrammatic representation of the effects of ambient temperature on the operation of the bimetal element in prior art gauge indicators.

The U-shape of the bimetal element 12 provides ambient temperature compensation at the low or unenergized end of the scale of the prior art devices in a manner best shown in the schematic representation of FIG. 2. The diagram supposes that the viewer is looking directly down at the prior art bimetal element 12 along the plane defined by the two legs 16, 20 in their aligned position at normal ambient temperature. Thus, the dot 36 represents the position of the pin 22 and the dot 38 represents the position of the bridge end 30 of the element 12 at normal ambient temperature with no current flowing through the winding 32. The pin end of leg 20 deflects to the right when current flows through heater winding 32 and the amount of deflection is dependent on the electrical power delivered to the winding. Leg 16 of the bimetal stays straight as long as the temperature of the surrounding environment remains around normal ambient. Point 44 on FIG. 2 represents the position of pin 22 at full scale deflection under normal ambient conditions. As may be seen the pin 22 travels along a path 37 which is essentially a cycloid because of the ever decreasing length of the arc segment the actuating legs 20 defines with increasing deviations from its normal position.

When the ambient temperature surrounding the bimetal element 12 increases substantially the bridge end 30 of the bimetal element 12 will assume a new position such as represented by dot 40 while the pin 22 remains stationary at the position 36 as long as no current passes through the winding 32. This is because the heat of the environment surrounding the bimetal 12 affects both legs 16 and 20 to the same degree to cause them to assume the same curved deflection.

Likewise the bridge end 30 of the element may assume the opposite position 42 if the ambient temperature of the environment surrounding the element falls substantially below normal ambient. The pin 22 still remains in the initial position 36 as long as no current passes through the winding 32. It is to be noted that the deflection distances 38–40 and 38–42 are substantially exaggerated in this figure to better portray the effects of changes in ambient temperature on the operation of the device.

A further study of FIG. 2 shows that inaccuracies do occur at the energized end of the scale due to changes in ambient temperature of the surrounding environment. As previously stated, if the bimetal 12 is in an environment of the normally designed ambient temperature, the bridge end 30 of the bimetal element remains at position 38 and the pin 22 may assume position 44 for a given current through the heater winding 32. If the bimetal element 12 is subjected to a higher ambient temperature represented by the position 40 of the bridge end 30, the pin 22 will then assume position 46 for the same value of current through winding 32. Likewise, if the ambient temperature drops below normal ambient so that the bridge end 30 deflects to position 42, the pin 22 will assume the position 48 if the winding 32 is subjected to the same current. It may therefore be seen by the positions of the pointer slots 24, shown in dotted lines in FIG. 2, that a substantial angular error E of the pointer 14 occurs between the hot ambient position 46 and the cold ambient position 48 for the same full scale measured current through winding 32. The maximum error occurs at the high end of the gauge scale and is proportionately smaller towards the zeros position.

Figure 3:
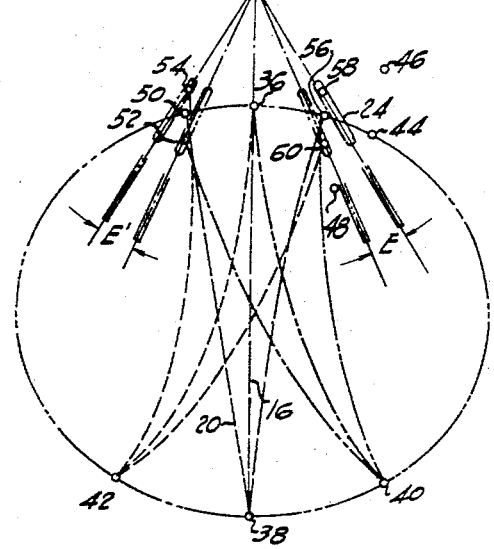
FIG. 3 is a diagrammatic representation of the effects of ambient temperature changes on a bimetal element adapted in accordance with the teachings of this invention.

The diagram in FIG. 3 illustrates how the errors at the high end of the scale may be materially reduced by the teachings of this invention. As shown the actuating leg 20 of the bimetal element is permanently deflected to the left or cold side of the position of the compensating leg 16. The cold side is defined as the side toward which the bridge end 38 deflects due to temperatures below the normal designed ambient level. The magnitude of the permanent deflection is preferably about one-half the distance pin 22 would move for full scale deflection or about one-half the distance between points 36 and 44 of FIG. 2. In FIG. 3 the dot 36 represents the position of the fixed end 18 of the actuator leg 16 and dot 50 represents the initial position of the pin 22 carried by the end of the permanently deflected actuator leg 20 under normal ambient conditions. Point 38 again represents the normal ambient position of the bridge end 30 of the bimetal element. In this case, of course, if the ambient temperature increases or decreases substantially with no current being supplied to the heater winding 32 the pin 22 no longer stays at its initial position 50. As may be seen when the bridge end 30 of the bimetal swings to its hot ambient position 40 the pin assumes a new initial position 52 whereas when the bridge portion 30 assumes the cold ambient position 42 the pin 22 is moved to new position 54. When a current is subjected to the heater winding 32 of the same magnitude as that for the description of FIG. 2, the full scale deflections of the actuating leg 20 cause the pin 22 to be positioned more accurately for a full scale reading. The full scale current through the heater winding causes the pin to be deflected to position 56 for the normal ambient condition, to position 58 for the hot ambient condition, and to position 60 for the cold ambient condition.

Errors do occur at the zero and full scale energization points on the scale, but they are no more than half the error which occurs at the high end of the scale in the prior art gauges. In addition the maximum accuracy of the gauge occurs in the mid-range portion where it is usually the most desirable. The prior art gauge is accurate only at the low reading portion which is usually undesirable. Therefore, a major improvement has been made over the prior art without adding any components to the device.

The principles hereinabove disclosed are also applicable to voltage regulators of the bimetal type. A voltage regulator comprises again a U-shaped element 12 having a fixed or compensating leg 16 and a free or actuating leg 20 about which the heater winding 32 is wound. In this case, however, the electric current for energizing the winding 32 passes through a set of contacts 60, 61, one of which is fixed to the actuating arm 20 and the other 61 which is fixed to, but insulated form, the support means 63 for the device. Contact 60 is also connectable at 64 to load for which regulation is desired. Current from the power source 62 for heating the actuator arm 20 passes through the contacts 60, 61 and heater winding 32 to ground to cause it to bend in a direction away from the fixed contact and eventually open the circuit. When the circuit opens the bimetal arm 20 cools to again close the contacts. The frequency with which this cycle occurs is dependent upon the voltage level of the source 62 and hence will pulse faster for lower voltages and slower for higher voltages.

The particular power level at which the device operates is dependent on the pressure between contacts 60, 61.

Figure 5:
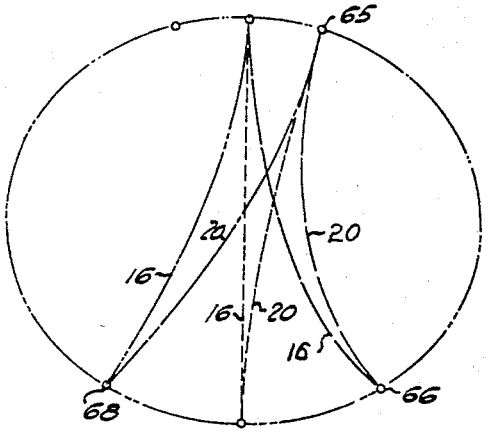
FIG. 5 is a diagrammatic representation of the effects of ambient temperature on the operation of the bimetal element in prior art voltage regulators.
Figure 4:
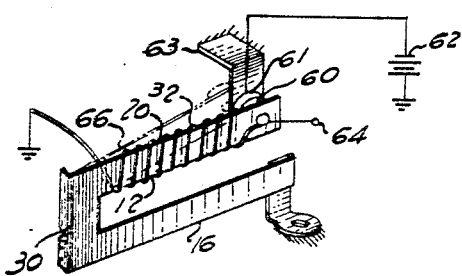
FIG. 4 is an isometric view, partially in schematic, of a voltage regulator embodying the teachings of this invention.

In the prior art devices the U-shaped bimetal is a flat element and the proper pressure is maintained by the fixed contact 60 pushing the contact 61 and, hence, actuator leg 20 out of alignment with the compensating leg 16. This position may be approximated by the dot 65 on FIG. 5. The curvature of arm 20 is representative of the pressure between the contacts 60, 61 which are positioned at point 65. If the environment temperature increases so that the bridge end 30 of the bimetal shifts to point 66, the actuator arm takes on a much greater curvature creating a greater pressure between the contacts 60, 61. Conversely, when the bridge end 30 of the bimetal swings toward position 68 due to cold temperatures, arm 20 has a tendency to straighten out and impose less pressure between the contacts 60, 61. The temperature changes clearly vary the set point about which the regulator operates and, hence, destroy the accuracy of operation at the extreme environmental conditions.

A voltage regulator fabricated in accordance with this invention has its bimetal element 12 formed with the actuating leg 20 in a permanently deflected position in the same manner as described for the gauge of FIG. 1. The fixed contact 61, however, mechanically biases the actuating leg 20 so that its free end is aligned with the compensating leg 16.

Referring to FIG. 3, the actuator leg is fabricated with its compensating leg assuming the position of dots 36, 38 and the actuator leg assuming its natural position defined by dots 50, 38. The fixed contact 61, however, bears against the contact 60 on the actuator leg 20 to constrain it to the position of dot 36. The deflection of the actuating arm 20 is calculated in the following manner. First, the pressure necessary to regulate about the desired power level is predetermined. The actuating leg 20 is then bent in the cold direction so that the pressure exerted by the fixed contact 60 against the contact 61 to bias the actuator leg into alignment with the compensating leg is equal to that predetermined pressure. Thus, the pressure between the contacts will vary very little whether the ambient temperature conditions cause the bridge end 30 of the bimetal to assume position 40 for hot ambient, 42 for cold ambient or 38 for normal ambient.

What is claimed is:

1. A thermostatic device comprising a housing, a stacked planar U-shaped bimetallic member having two leg portions and a connecting portion, the end of one leg portion fixed with respect to said housing, functional means operable by the end of said other leg, a heater winding on said other leg adapted to conduct an electric current, said other leg of said bimetallic member having a permanent deflection from the plane of said bimetallic member in the cold direction.

2. The electrical device of claim 1, wherein the other leg portion of said bimetallic means has a permanent deflection from said one leg portion on the cold side approximately one-half the total deflection of said actuating portion over the total range of said heating means in a normal ambient temperature.

3. The thermostatic device of claim 1 wherein said functional means comprises a pointer mechanically linked to the end of the other leg portion, said other leg portion of said bimetallic member having a permanent deflection from said one leg portion in the cold direction approximately one-half the deflection of said other leg portion between its zero and full scale positions in a normal ambient temperature.

4. A thermostatic voltage regultor for use in a circuit including a power source and a load comprising a housing, a planar stacked U-shaped bimetallic member having two leg portions and a connecting portion, the end of one leg portion fixed with respect to said housing, the end of the other leg portion carrying a first electric contact, a heater winding on said other leg portion having one end electrically connected to said first contact, a second contact, said second contact and the other end of said winding adapted for series connection with said source and said load, said other leg having a permanent deflection from the plane of said bimetallic member in the cold direction determined by the force necessary between the contacts to regulate about the desired power level, and means including said second contact biasing said other leg portion to a normal at-rest position in alignment with said one leg.

References Cited

UNITED STATES PATENTS

| | | | |
|---|---|---|---|
| 2,520,899 | 8/1950 | Smulski | 324—106 |
| 2,991,418 | 7/1961 | Kraft | 324—106 |

RUDOLPH V. ROLINEC, *Primary Examiner.*

E. F. KARLSEN, *Assistant Examiner.*

U.S. Cl. X.R.

323—68; 324—106